(12) United States Patent
He

(10) Patent No.: US 8,750,367 B1
(45) Date of Patent: Jun. 10, 2014

(54) TRANSCEIVER WITH SINGLE COEFFICIENT BASED EQUALIZER TAPS

(71) Applicant: Marvell International Ltd., Hamilton (BM)

(72) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/682,154

(22) Filed: Nov. 20, 2012

Related U.S. Application Data

(63) Continuation of application No. 13/252,098, filed on Oct. 3, 2011, now Pat. No. 8,315,301, which is a continuation of application No. 12/283,664, filed on Sep. 15, 2008, now Pat. No. 8,031,765, which is a continuation of application No. 11/011,178, filed on Dec. 15, 2004, now Pat. No. 7,426,236, which is a continuation of application No. 09/644,532, filed on Aug. 24, 2000, now Pat. No. 6,870,881.

(51) Int. Cl.
*H03H 7/30* (2006.01)

(52) U.S. Cl.
USPC .......................................... 375/233; 375/232

(58) Field of Classification Search
USPC ................. 375/232, 233, 254, 346, 348, 350; 708/319, 322, 323
See application file for complete search history.

(56) References Cited

U.S. PATENT DOCUMENTS

| | | | |
|---|---|---|---|
| 5,117,291 A * | 5/1992 | Fadavi-Ardekani et al. . 348/614 | |
| RE34,206 E | 3/1993 | Sayar | |
| 5,327,460 A | 7/1994 | Batruni | |
| 5,345,476 A | 9/1994 | Tsujimoto | |
| 5,367,540 A | 11/1994 | Kakuishi et al. | |
| 5,414,733 A | 5/1995 | Turner | |
| 5,513,216 A | 4/1996 | Gadot et al. | |
| 5,553,014 A * | 9/1996 | De Leon et al. ............... 708/322 |
| 5,561,687 A | 10/1996 | Turner | |
| 5,581,585 A | 12/1996 | Takatori et al. | |
| 5,604,769 A | 2/1997 | Wang | |
| 5,617,450 A | 4/1997 | Kakuishi et al. | |
| 5,748,674 A | 5/1998 | Lim | |
| 5,793,801 A | 8/1998 | Fertner | |
| 6,055,269 A | 4/2000 | Drost et al. | |
| 6,115,418 A | 9/2000 | Raghavan | |
| 6,144,697 A | 11/2000 | Gelfand et al. | |
| 6,178,198 B1 | 1/2001 | Samueli et al. | |
| 6,252,904 B1 | 6/2001 | Agazzi et al. | |
| 6,363,129 B1 * | 3/2002 | Agazzi ........................ 375/355 |
| 6,459,730 B1 | 10/2002 | Samueli et al. | |
| 6,665,308 B1 * | 12/2003 | Rakib et al. ................... 370/441 |
| 6,775,529 B1 | 8/2004 | Roo | |
| 6,870,881 B1 | 3/2005 | He | |
| 7,167,516 B1 | 1/2007 | He | |

* cited by examiner

*Primary Examiner* — Young T. Tse

(57) ABSTRACT

A transceiver including an equalizer configured to receive an input signal. A control circuit selects a predetermined coefficient, maintains the predetermined coefficient at a fixed value, and based on the predetermined coefficient, selects first coefficients and second coefficients. The control circuit that, while maintaining the predetermined coefficient at the fixed value and while the equalizer is receiving the input signal, adjusts a coefficient of one of the first or second coefficients. The equalizer includes: first taps configured to, based on the first coefficients, filter the input signal to generate a first filtered signal; a unity tap configured to, based on the predetermined coefficient, filter the first filtered signal to generate a second filtered signal; and second taps configured to, based on the second coefficients, filter the second filtered signal to generate a third filtered signal. An output transmits the third filtered signal.

21 Claims, 6 Drawing Sheets

Related Art

Precursor   Main   Postcursor

US 8,750,367 B1

TRANSCEIVER WITH SINGLE COEFFICIENT BASED EQUALIZER TAPS

CROSS-REFERENCE TO RELATED APPLICATIONS

This present disclosure is a continuation of U.S. application Ser. No. 12/283,664 (now U.S. Pat. No. 8,315,301), filed on Sep. 15, 2008, which is a continuation of U.S. application Ser. No. 11/011,178 (now U.S. Pat. No. 7,426,236), filed on Dec. 15, 2004, which is a continuation of U.S. application Ser. No. 09/644,532 (now U.S. Pat. No. 6,870,881), filed on Aug. 24, 2000.

FIELD

This disclosure relates generally to a feedforward equalizer used in conjunction with a decision feedback equalizer in a data communications channel. More particularly the present disclosure relates to a feedforward equalizer used in conjunction with a decision feedback equalizer for a gigabit Ethernet transceiver.

BACKGROUND

A feedforward equalizer is an extremely useful component of a digital signal processor used to shape and otherwise to filter an input signal so as to obtain an output signal with desired characteristics. Feedforward equalizers may be used in such diverse fields as Ethernet transceivers, read circuits for disk drives, ghost cancellation in broadcast and cable TV transmission, channel equalization for communication in magnetic recording, echo cancellation, estimation/prediction for speech processing, adaptive noise cancellation, etc.

A feedforward equalizer is particularly suited for filtering inter-symbol interference (ISI). To varying degrees, ISI is always present in a data communications system. ISI is the result of the transmission characteristics of the communications channel, i.e., the "channel response," and, generally speaking, causes neighboring data symbols, in a transmission sequence, to spread out and interfere with one another. If the channel response is bad, or severe, ISI becomes a major impediment to having low error rate communications between two data endpoints. In fact, at higher data rates, i.e., frequencies, the effect of ISI is more severe since there is more high frequency attenuation in the transmission channel. Consequently, current efforts to push transmission speeds higher and higher in the local loop environment must effectively contend with ISI effects on a transmitted data signal to be successful.

Generally speaking, the ISI can be divided into two components, namely precursor and post cursor ISI. Conventionally a feedforward equalizer (FFE) attempts to remove precursor ISI, and decision feedback equalization (DFE) attempts to remove postcursor ISI. FIG. 1 is illustrative of a conventional feedforward equalizer used in conjunction with decision feedback equalizer in a data communications channel. As shown in FIG. 1, an analog input signal from a communication channel is converted to a digital signal by analog-to-digital converter 102. The digital signal is processed by FFE 104 and DFE 105 in a conventional manner. DFE 105 includes decision circuit 108 and feedback filter 110. Examples of conventional arrangements are discussed in U.S. Pat. Nos. 5,513,216 and 5,604,769, the contents of each of which are incorporated by reference herein.

However, in conventional arrangements, the length of the postcursor ISI is rather large, as shown in FIG. 2. To process a signal with a long tail, the feedback filter needs to have a proportionately large number of taps. This results in higher complexity and severe error propagation.

SUMMARY

A transceiver is provided and includes an equalizer configured to receive an input signal. A control circuit is configured to (i) select a predetermined coefficient, (ii) maintain the predetermined coefficient at a fixed value, and (iii) based on the predetermined coefficient, select first coefficients and second coefficients. The control circuit is configured to, while maintaining the predetermined coefficient at the fixed value and while the equalizer is receiving the input signal, adjust a coefficient of one of (i) the first coefficients, or (ii) the second coefficients. The equalizer includes: first taps configured to, based on the first coefficients, filter the input signal to generate a first filtered signal; a unity tap configured to, based on the predetermined coefficient, filter the first filtered signal to generate a second filtered signal; and second taps configured to, based on the second coefficients, filter the second filtered signal to generate a third filtered signal. An output is configured to transmit the third filtered signal.

A method is provided and includes: receiving an input signal; selecting a predetermined coefficient; maintaining the predetermined coefficient at a fixed value; and based on the predetermined coefficient, selecting first coefficients and second coefficients. While maintaining the predetermined coefficient at the fixed value and while receiving the input signal, adjusting a coefficient of one of (i) the first coefficients, or (ii) the second coefficients. Based on the first coefficients, filter the input signal via first taps to generate a first filtered signal. Based on the predetermined coefficient, filter the first filtered signal via a unity tap to generate a second filtered signal. Based on the second coefficients, filter the second filtered signal via second taps to generate a third filtered signal. The third filtered signal is transmitted.

According to another aspect of the present disclosure, a signal processing apparatus includes an input circuit to receive an input signal. A feedforward equalizer includes a high-pass filter and is responsive to the input circuit. A decision feedback equalizer includes a decision circuit responsive to the feed forward equalizer and a feedback filter responsive to the decision circuit. The decision circuit is responsive to the feedback filter.

According to another aspect of the present disclosure, the high-pass filter has a low cutoff frequency.

According to another aspect of the present disclosure, the high-pass filter has a flat response.

According to another aspect of the present disclosure, the high-pass filter has high attenuation at low frequency.

According to another aspect of the present disclosure, the high-pass filter has high attenuation at low frequencies.

According to another aspect of the present disclosure, the high attenuation is at least 20 db.

According to another aspect of the present disclosure, the high-pass filter includes a first finite impulse response (FIR) filter.

According to another aspect of the present disclosure, the first FIR filter includes M taps to filter precursor intersymbol interference (ISI), one main tap and N taps to filter postcursor ISI.

According to another aspect of the present disclosure, each tap of the first FIR filter has a corresponding coefficient W as follows:

$$W_0 = \text{unity}$$
$$0 < \sum_{1}^{M} W_{-i} + W_o + \sum_{1}^{n} W_i << 1, \text{ and}$$
$$-1 < W_1, \ldots, W_n < 0.$$

According to another aspect of the present disclosure, the input circuit includes an analog-to-digital converter.

According to another aspect of the present disclosure, the decision circuit includes a threshold circuit.

According to another aspect of the present disclosure, the decision circuit includes a Viterbi detector.

According to another aspect of the present disclosure, a first adaptive control circuit is provided to adapt the M taps for filtering precursor ISI and N taps for filtering.

According to another aspect of the present disclosure, each of the N taps includes a limiter to limit the range of adaptation of the N taps.

According to another aspect of the present disclosure, the first adaptive control circuit is operable only during signal acquisition.

According to another aspect of the present disclosure, the feedback filter includes a second finite impulse response (FIR) filter.

According to another aspect of the present disclosure, a second adaptive control circuit to adapt taps of the second FIR.

According to another aspect of the present disclosure, a signal processing apparatus includes an input means for receiving an input signal. A feedforward equalizer means is provided for feedforward equalizing by high-pass filtering the input signal received by the input means. A decision feedback equalizer means includes a decision means for recovering data from an output of the feedforward equalizer means and a feedback filter means for filtering an output of the decision means. The decision means is responsive to the feedback filter means.

According to another aspect of the present disclosure, the feedforward equalizer means has a low cutoff frequency.

According to another aspect of the present disclosure, the feedforward equalizer means has a flat response.

According to another aspect of the present disclosure, the feedforward equalizer means has high attenuation at low frequency.

According to another aspect of the present disclosure, the feedforward equalizer means has high attenuation at low frequencies.

According to another aspect of the present disclosure, the feedforward equalizer means shortens a length of postcursor inter-symbol interference.

According to another aspect of the present disclosure, the feedforward equalizer means attenuates any DC noise.

According to another aspect of the present disclosure, the feedforward equalizer means attenuates baseline wander.

According to another aspect of the present disclosure, the high attenuation is at least 20 dB.

According to another aspect of the present disclosure, the feedforward equalizer means includes a first finite impulse response (FIR) filter means for filtering the input signal.

According to another aspect of the present disclosure, the first FIR filter means includes M taps for filtering precursor ISI, one main tap and N taps for filtering postcursor ISI.

According to another aspect of the present disclosure, each tap of the first FIR filter means has a corresponding coefficient W as follows:

$$W_0 = \text{unity}$$
$$0 < \sum_{1}^{M} W_{-i} + W_o + \sum_{1}^{n} W_i << 1, \text{ and}$$
$$-1 < W_1, \ldots, W_n < 0.$$

According to another aspect of the present disclosure, the input means includes an analog-to-digital converter means for converting an analog input signal to a digital signal.

According to another aspect of the present disclosure, the decision means includes a threshold circuit.

According to another aspect of the present disclosure, the decision means includes a Viterbi detector.

According to another aspect of the present disclosure, a first adaptive control means is provided for adapting the M taps for filtering precursor ISI and N taps for filtering.

According to another aspect of the present disclosure, each of the N taps includes a limiting means for limiting the range of adaptation of the N taps.

According to another aspect of the present disclosure, the first adaptive control means is operable only during signal acquisition.

According to another aspect of the present disclosure, the feedback filter means includes a second finite impulse response (FIR) filter means for filtering the output of the decision means.

According to another aspect of the present disclosure, a second adaptive control means is provided for adapting taps of the second FIR means.

BRIEF DESCRIPTION OF THE DRAWINGS

Other objects and advantages of the present disclosure will become apparent to those skilled in the art upon reading the following detailed description of embodiments, in conjunction with the accompanying drawings, wherein like reference numerals have been used to designate like elements, and wherein.

DESCRIPTION

Various implementations will now be described with reference to a feedforward equalizer used in an Ethernet transceiver device. The feedforward equalizer (FFE) may be embodied in an Integrated Circuit disposed between a digital interface and an RJ45 analog jack. The Integrated Circuit may be installed inside a PC on the network interface card or the motherboard, or may be installed inside a network switch or router. However, other embodiments include applications in read circuits for disk drives, ghost cancellation in broadcast and cable TV transmission, channel equalization for communication in magnetic recording, echo cancellation, estimation/prediction for speech processing, adaptive noise cancellation, etc. All such embodiments are included within the scope of the appended claims.

Moreover, while implementations will be described with respect to the functional elements of the FFE, a person of ordinary skill in the art will be able to embody such functions in discrete digital or analog circuitry, or as software executed by a general purpose processor (e.g., a CPU) or digital signal processor.

Figure 9:
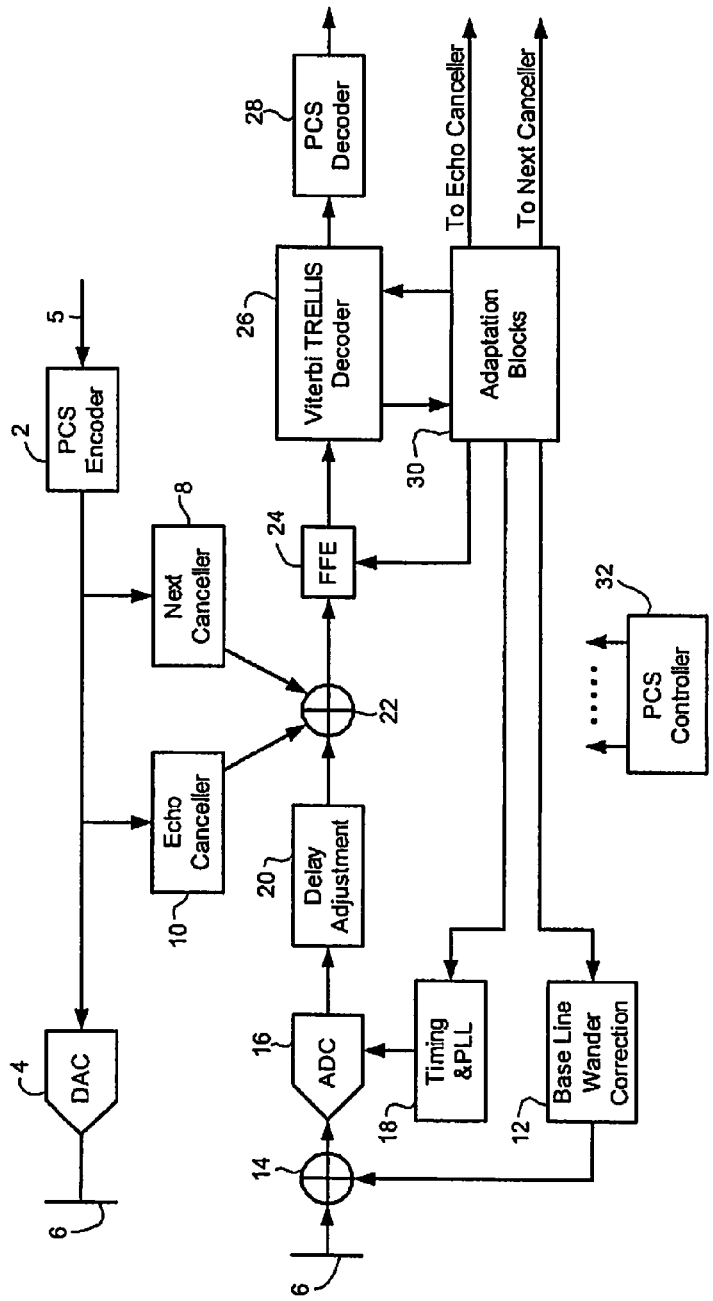
FIG. 9 is a block diagram of an Ethernet transceiver incorporating the feedforward equalizer used in conjunction with a decision feedback equalizer, in accordance with the present disclosure.

A functional block diagram of an Ethernet transceiver incorporating the FFE according to the present disclosure is depicted in FIG. 9. Although only one channel is depicted therein, four parallel channels are typically used in Gigabit Ethernet applications. Only one channel is depicted and described herein for clarity.

A 125 MHz, 250 Mbps digital input signal from a PC is PCS-encoded in a PCS encoder 2 and is then supplied to a D/A converter 4 for transmission to the Ethernet cable 6. The PCS-encoded signal is also supplied to a NEXT (Near End Transmitter) noise canceller 8 and to adaptive echo canceller 10.

Signals from the Ethernet cable 6 are received at adder 14 and added with correction signals supplied from baseline wander correction block 12 (which corrects for DC offset). The added signals are then converted to digital signals in the A/D converter 16, as controlled by timing and phase-lock-loop block 18. The digital signals from A/D converter 16 are supplied to delay adjustment block 20, which synchronizes the signals in accordance with the four parallel Ethernet channels. The delay-adjusted digital signals are then added with the echo-canceled signals and the NEXT-canceled signals in adder 22.

The added signals are supplied to a Feed Forward Equalizer filter 24 which filters the signal prior to DFE, or, more specifically, Viterbi trellis decoding in decoder 26. After Viterbi decoding, the output signal is supplied to PCS decoder 28, after which the PCS-decoded signal is supplied to the PC.

The decoder 26 also supplies output signals to a plurality of adaptation blocks schematically depicted at 30 in FIG. 9. As is known, such adaptation blocks carry out corrections for such conditions as temperature offset, connector mismatch, etc. The adaptation block 30 provides output to the baseline wander correction circuit 12, the timing and phase-lock-loop circuit 18, the echo canceller 10, and the NEXT canceller 8. Each functional block depicted in FIG. 9 includes a slave state controller (not shown) for controlling the operation and timing of the corresponding block.

Figure 1:
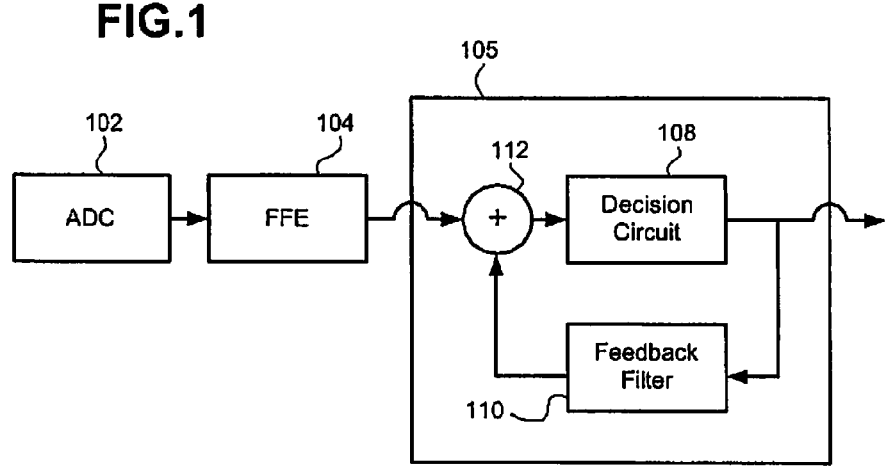
FIG. 1 is a block diagram of a feedforward equalizer used in conjunction with a decision feedback equalizer.
Figure 2:
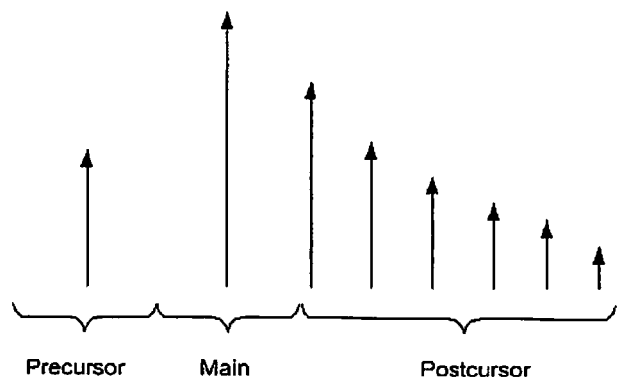
FIG. 2 illustratively shows the length of the postcursor intersymbol interference (ISI) when an input signal is processed by a conventional arrangement.
Figure 3:
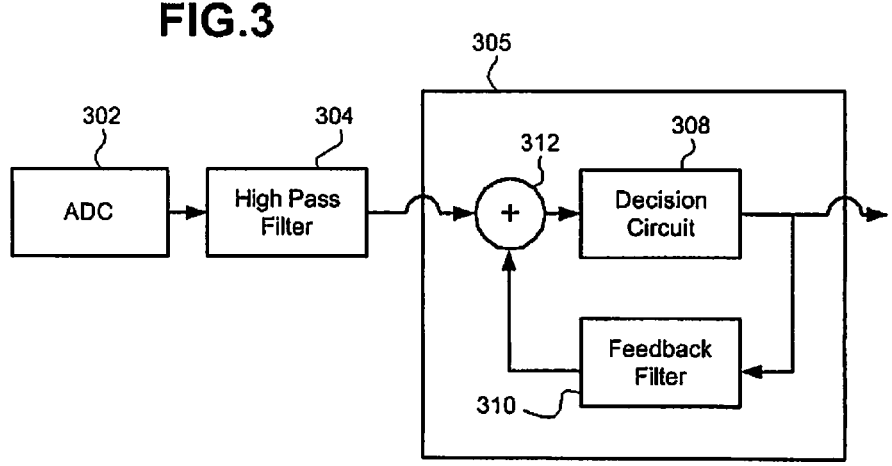
FIG. 3 is a block diagram of a feedforward equalizer implemented as a high-pass filter used in conjunction with a decision feedback equalizer, in accordance with a first embodiment of the present disclosure.
Figure 4:
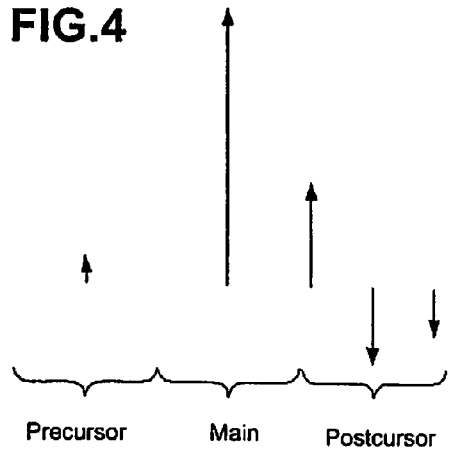
FIG. 4 illustratively shows the length of the postcursor ISI of when an input signal is processed by the present disclosure.

Reference is now made to FIG. 3 which shows a block diagram of a feedforward equalizer implemented as a high-pass filter used in conjunction with a decision feedback equalizer, in accordance with a first embodiment of the present disclosure. As shown therein, an analog input signal is converted to a digital signal by analog-to-digital converter (ADC) 302. The FFE 304 processes the digitized input signal to effectively cancel the precursor intersymbol interference (ISI) and shorten the length of the postcursor ISI. FIG. 4 illustratively shows the shortened length of the postcursor ISI when an input signal is processed by FFE 304 of the present disclosure. FFE 304 may be implemented as a high-pass filter to shorten the tail. The output of FFE 304 is then processed by DFE 305 to effectively cancel the postcursor ISI in a known manner. DFE 305 includes decision circuit 308 and feedback filter 310. Decision circuit 308 may be implemented by, for example, a threshold circuit, a Viterbi detector or the like. Feedback filter 310 may be implemented as a Finite Impulse Response (FIR) filter.

Figure 5:
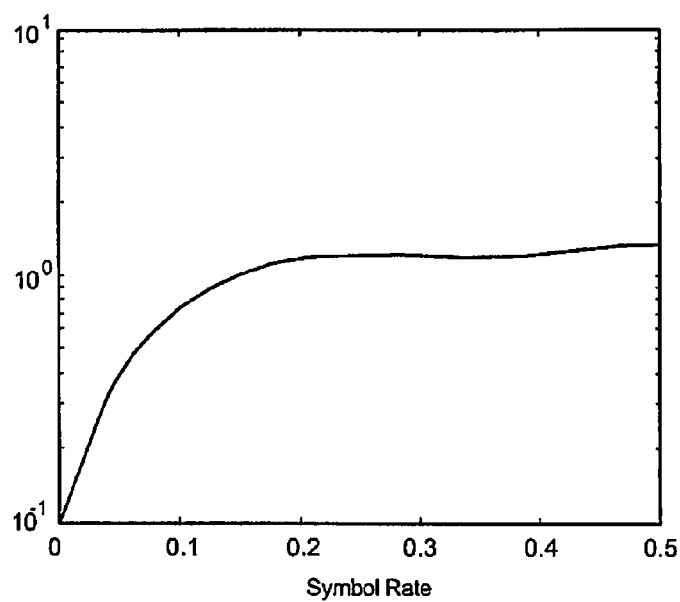
FIG. 5 illustrates the frequency response of the high-pass filter in accordance with FIG. 3.

FIG. 5 illustrates the response characteristics of high-pass filter of FFE 304. The filter has a low cutoff frequency. As can be seen in FIG. 5, at higher frequencies the filter has a relatively flat response and has high attenuation at low frequencies (e.g., 20 db). This characteristic is advantageous in attenuating any DC noise and any DC components caused by baseline wander. Significantly, the flat response reduces noise enhancement.

Figure 6:
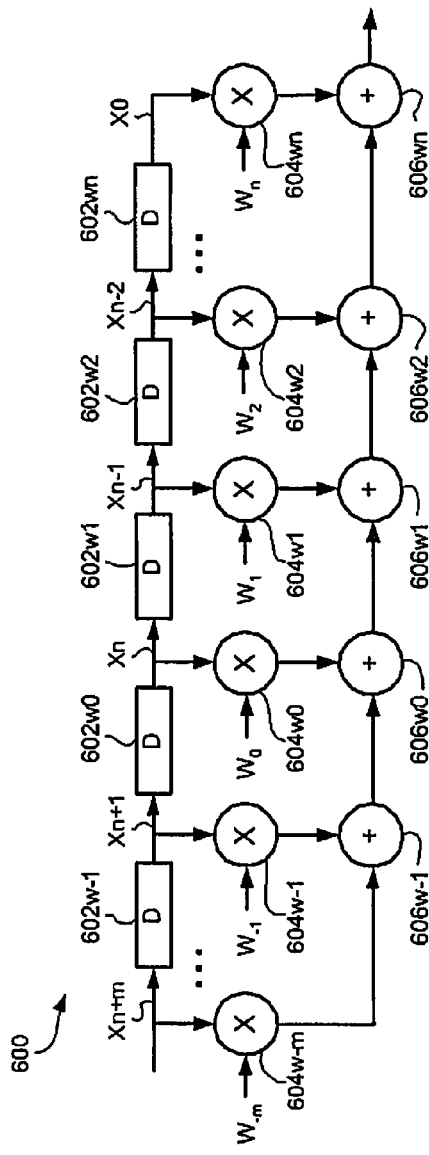
FIG. 6 is a schematic drawing of the high-pass filter of FIG. 3 implemented as an finite impulse response (FIR) filter.

Referring now to FIG. 6, high-pass filter 304 may be implemented as a finite impulse response (FIR) filter 600. FIR filter 600 includes M taps for filtering precursor ISI, one main tap and N taps for filtering postcursor ISI. In this embodiment, M=1 and N=3. Each tap includes a delay 602 (except for the first tap), a multiplier 604 and a summer 606 (except for the first tap). Delay circuit 602 delays an output from a previous tap, and multiplier 604 multiples the output from delay circuit 602 by a coefficient W. The output of multiplier 604 is added to an output from of previous tap by summer 606.

The selection of the coefficients W is critical in providing the response defined in FIG. 5. The appropriate selection of coefficients $W_1, \ldots, W_n$ determines the sharpness of the response, and the appropriate selection of coefficients $W_{-m}$-$W_{-1}$ effectively cancels the precursor tail. In the present embodiment the coefficients are selected from the following constraints:

$$W_0 = \text{unity}$$

$$0 < \sum_1^M W_{-i} + W_o + \sum_1^n W_i \ll 1,$$

$$-1 < W_1, \ldots, W_n < 0,$$

in this embodiment $$W_0 = 1;$$

$$W_{-1} = -0.1;$$

$$W_{-1} + W_0 + W_1 + W_2 + W_3 = 0.1;$$

$$|W_1| > |W_2| > |W_3|; \text{ and}$$

$$-1 < W_1, W_2, W_3 < 0, W_1 = -0.35, W_2 = -0.25, \text{ and } W_3 = -0.20.$$

As will be appreciated by one of ordinary skill in the art, the values discussed above may be proportionately varied to still achieve very similar and acceptable responses.

Figure 7:
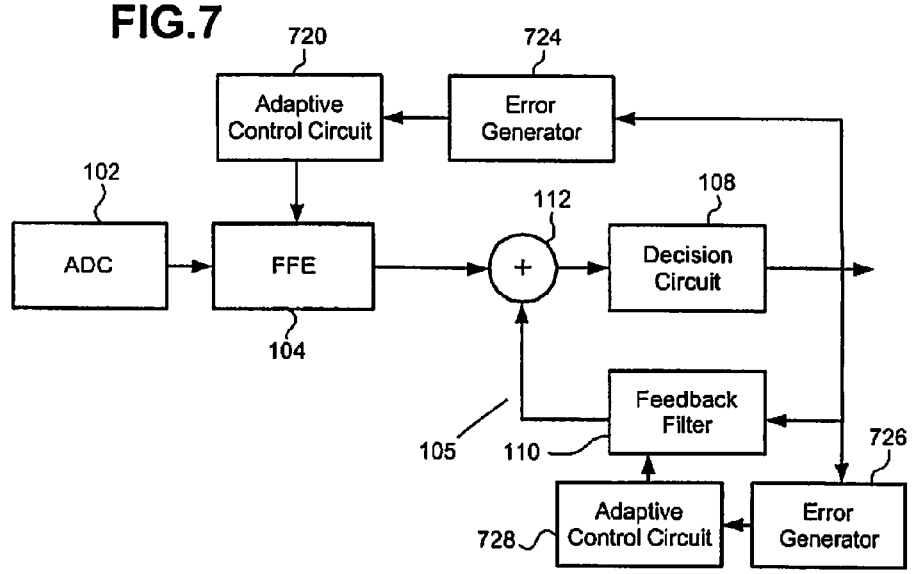
FIG. 7 is a block diagram of a feedforward equalizer implemented as an adaptive high-pass filter used in conjunction with a decision feedback equalizer, in accordance with a second embodiment of the present disclosure.

FIG. 7 is an alternate embodiment of the present disclosure, in which the coefficients of the FIR filter of the FFE are adaptive and the coefficients of the FIR filter of the feedback filter are also adaptive. In general, an error generator circuit 724 is provided to determine any errors during signal acquisition, and an error signal is provided to an adaptive control circuit 720 to move the coefficients of the FFE. These coefficients of the FFE are only moved during signal acquisition. After acquisition, the coefficients of the FFE are then held at the values determined during acquisition. Also, an error generator 726 determines if there are any errors from feedback filter 110 and provides an error signal to adaptive control circuit 728. Adaptive control circuit 728 moves coefficients for feedback filter 110.

Figure 8:
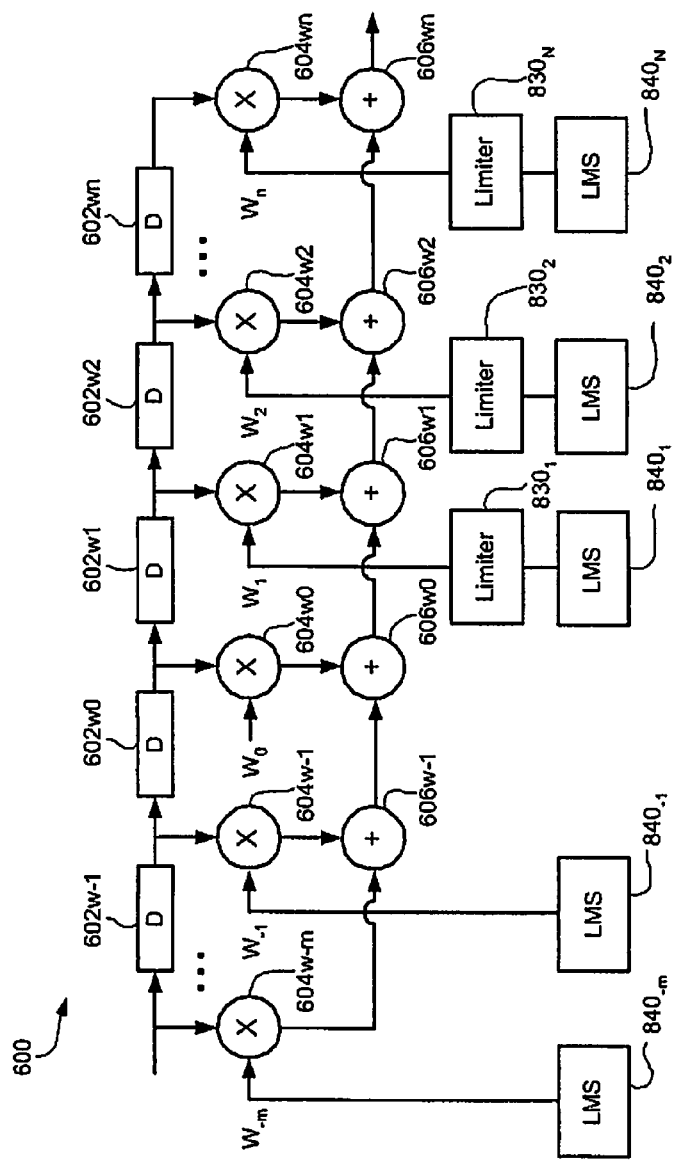
FIG. 8 is a schematic drawing of the high-pass filter of FIG. 7 implemented as an adaptive finite impulse response (FIR) filter.

FIG. 8 shows a more detailed schematic of an adaptive FIR filter for FFE. As shown therein, the main tap $W_0$ is kept at its initial value and is not adapted. Coefficients $W_{-m}, \ldots, W_{-1}$ can be determined by LMS engines $840_{-m}, \ldots, 840_{-1}$ in accordance with a least mean square (LMS) algorithm based on gradient optimization. The change in tap weight coefficients $\Delta W_n$ is calculated to be $\Delta W_n = \Delta * X_n * E_n$, where $\Delta$ is the adaptation rate and E is the error output by the error generator 724. Coefficients $W_1, \ldots, W_n$ are similarly determined by LMS engines $840_1, \ldots, 840_n$. In addition limiters $830_1, \ldots, 830_n$ are provided to enforce the constraints discussed above.

While implementations have been described in conjunction with several specific embodiments, it is evident to those skilled in the art that many further alternatives, modifications and variations will be apparent in light of the foregoing description. Thus, the disclosure described herein is intended to embrace all such alternatives, modifications, applications and variations as may fall within the spirit and scope of the appended claims.

What is claimed is:

1. A transceiver comprising:
    an equalizer configured to receive an input signal;
    a control circuit configured to (i) select a predetermined coefficient, (ii) maintain the predetermined coefficient at a fixed value, and (iii) based on the predetermined coefficient, select a first plurality of coefficients and a second plurality of coefficients,
    wherein the control circuit is configured to select the predetermined coefficient, at least one of the first plurality of coefficients, and the second plurality of coefficients such that a sum of the predetermined coefficient, the at least one of the first plurality of coefficients, and the second plurality of coefficients is equal to a predetermined value,
    wherein the control circuit is configured to, while maintaining the predetermined coefficient at the fixed value and while the equalizer is receiving the input signal, adjust a coefficient of one of (i) the first plurality of coefficients, or (ii) the second plurality of coefficients, and
    wherein the equalizer comprises
        a first plurality of taps configured to, based on the first plurality of coefficients, filter the input signal to generate a first filtered signal,
        a unity tap configured to, based on the predetermined coefficient, filter the first filtered signal to generate a second filtered signal, and
        a second plurality of taps configured to, based on the second plurality of coefficients, filter the second filtered signal to generate a third filtered signal; and
    an output configured to transmit the third filtered signal.

2. The transceiver of claim 1, wherein:
    the equalizer further comprises a plurality of delay elements;
    the plurality of delay elements are configured to generate a plurality of delayed versions of the input signal;
    the plurality of delayed versions of the input signal comprise first delayed versions and second delayed versions;
    the first plurality of taps are configured to, based on the first delayed versions, filter the input signal to generate the first filtered signal;
    the unity tap is configured to, based on one of the first delayed versions, filter the first filtered signal to generate the second filtered signal; and
    the second plurality of taps are configured to, based on the second delayed versions, filter the second filtered signal to generate the third filtered signal.

3. The transceiver of claim 1, wherein:
    the first plurality of coefficients comprise a first coefficient and a second coefficient;
    the second plurality of coefficients comprise a third coefficient and a fourth coefficient;
    the first plurality of taps comprise a first tap and a second tap;
    the first tap is configured to filter the input signal based on the first coefficient;
    the second tap is configured to filter an output of the first tap based on the second coefficient to generate the first filtered signal;
    the second plurality of taps comprise a third tap and a fourth tap;
    the third tap is configured to filter the second filtered signal based on the third coefficient; and
    the fourth tap is configured to filter an output of the third tap based on the fourth coefficient to generate the third filtered signal.

4. The transceiver of claim 1, wherein the control circuit is configured to, based on least mean square algorithm, maintain the predetermined coefficient at the fixed value while adjusting the coefficient of the one of (i) the first plurality of coefficients, or (ii) the second plurality of coefficients.

5. The transceiver of claim 1, further comprising a plurality of least mean square devices configured to adjust the first plurality of coefficients and the second plurality of coefficients,
    wherein the control circuit maintains the predetermined coefficient at the fixed value while the least mean square devices adjust the first plurality of coefficients and the second plurality of coefficients.

6. The transceiver of claim 1, wherein:
    the first plurality of taps are configured to generate first delayed versions of the input signal;
    each of the first plurality of taps is configured to multiply one of the first plurality of coefficients by a respective one of the first delayed versions;
    the second plurality of taps are configured to generate second delayed versions of the second filtered signal; and
    each of the second plurality of taps is configured to multiple one of the second plurality of coefficients by a respective one of the second delayed versions.

7. The transceiver of claim 6, wherein the second plurality of taps comprise a plurality of summers configured to generate the third filtered signal by summing (i) results of multiplying the first plurality of coefficients by the first delayed versions, (ii) the second filtered signal, and (iii) results of multiplying the second plurality of coefficients by the second delayed versions.

8. The transceiver of claim 1, wherein:
the first plurality of taps are configured to filter precursor inter-symbol interference in the input signal to generate the first filtered signal; and
the second plurality of taps are configured to filter postcursor inter-symbol interference in the second filtered signal to generate the third filtered signal.

9. The transceiver of claim 1, wherein the control circuit is configured to select the predetermined coefficient, one of the first plurality of coefficients, and the second plurality of coefficients such that a sum of the predetermined coefficient, the one of the first plurality of coefficients, and the second plurality of coefficients is equal to a predetermined value.

10. The transceiver of claim 1, further comprising an error generator configured to generate an error signal based on the third filtered signal,
wherein the control circuit is configured to, based on the error signal, adjust the first plurality of coefficients and the second plurality of coefficients.

11. The transceiver of claim 1, wherein:
the first plurality of taps comprise
first multipliers each configured to multiply one of the first plurality of coefficients by one of (i) the input signal, or (ii) one of first delayed versions of the input signal, and
a first summer configured to sum outputs of at least two of the first multipliers to generate the first filtered signal;
the unit tap comprises
a second multiplier configured to multiple a second delayed version of the input signal by the predetermined coefficient, and
a second summer configured to, generate the second filtered signal, based on a sum of (i) an output of the second multiplier, and (ii) the first filtered signal; and
the second plurality of taps comprise
third multipliers each configured to multiply one of third delayed versions of the input signal by one of the second plurality of coefficients, and
third summers each configured to generate the third filtered signal based on a sum of (i) a respective output of the third multipliers with (ii) the second filtered signal or an output of one of the third summers.

12. The transceiver of claim 1, wherein the control circuit is configured to adjust the first plurality of coefficients or the second plurality of coefficients based on an adaptation rate.

13. The transceiver of claim 1, further comprising:
a second equalizer configured to (i) receive the third filtered signal, and (ii) cancel postcursor inter-symbol interference from the third filtered signal; and
an error generator configured to generate an error signal in response to an output of the second equalizer,
wherein the control circuit is configured to adjust the first plurality of coefficients or the second plurality of coefficients based on the error signal.

14. The transceiver of claim 13, wherein the second equalizer comprises:
a decision circuit configured to receive a summation signal;
a feedback filter configured to filter an output of the decision circuit; and
a summer configured to generate the summation signal based on a sum of (i) the third filtered signal and (ii) an output of the feedback filter.

15. The transceiver of claim 14, wherein the decision circuit is implemented as a threshold circuit or a Viterbi detector.

16. The transceiver of claim 1, further comprising an error generator configured to (i) detect errors generated during acquisition of the input signal, and (ii) generate an error signal,
wherein the control circuit is configured to, based on the error signal and an adaptation rate, adaptively adjust (i) the first plurality of coefficients, or (ii) the second plurality of coefficients.

17. A method comprising:
receiving an input signal;
selecting a predetermined coefficient;
maintaining the predetermined coefficient at a fixed value;
based on the predetermined coefficient, selecting a first plurality of coefficients and a second plurality of coefficients;
selecting the predetermined coefficient, at least one of the first plurality of coefficients, and the second plurality of coefficients such that a sum of the predetermined coefficient, the at least one of the first plurality of coefficients, and the second plurality of coefficients is equal to a predetermined value;
while maintaining the predetermined coefficient at the fixed value and while receiving the input signal, adjusting a coefficient of one of (i) the first plurality of coefficients, or (ii) the second plurality of coefficients;
based on the first plurality of coefficients, filtering the input signal via a first plurality of taps to generate a first filtered signal;
based on the predetermined coefficient, filtering the first filtered signal via a unity tap to generate a second filtered signal;
based on the second plurality of coefficients, filtering the second filtered signal via a second plurality of taps to generate a third filtered signal; and
transmitting the third filtered signal.

18. The method of claim 17, further comprising:
generating a plurality of delayed versions of the input signal, wherein the plurality of delayed versions of the input signal comprise first delayed versions and second delayed versions;
based on the first delayed versions, filtering the input signal via the first plurality of taps to generate the first filtered signal;
based on one of the first delayed versions, filtering the first filtered signal via the unity tap to generate the second filtered signal; and
based on the second delayed versions, filtering the second filtered signal via the second plurality of taps to generate the third filtered signal.

19. The method of claim 17, further comprising:
based on a first coefficient of the first plurality of coefficients, filtering the input signal via a first tap of the first plurality of taps;
based on a second coefficient of the first plurality of coefficients, filtering an output of the first tap via a second tap of the first plurality of taps to generate the first filtered signal;
based on a third coefficient of the second plurality of coefficients, filtering the second filtered signal via a third tap of the second plurality of taps; and
based on a fourth coefficient of the second plurality of coefficients, filtering an output of the third tap via a fourth tap of the second plurality of taps to generate the third filtered signal.

20. The method of claim 17, further comprising:

based on a least mean square algorithm, adjusting the first plurality of coefficients and the second plurality of coefficients; and maintaining the predetermined coefficient at the fixed value while adjusting the coefficient of the one of (i) the first plurality of coefficients, or (ii) the second plurality of coefficients.

21. A transceiver comprising:

an equalizer configured to receive an input signal;

a control circuit configured to (i) select a predetermined coefficient, (ii) maintain the predetermined coefficient at a fixed value, and (iii) based on the predetermined coefficient, select a first plurality of coefficients and a second plurality of coefficients, wherein the control circuit is configured to, based on the predetermined coefficient, limit to a predetermined range a sum of (i) the first plurality of coefficients and (ii) the second plurality of coefficients, wherein the control circuit is configured to, while maintaining the predetermined coefficient at the fixed value and while the equalizer is receiving the input signal, adjust a coefficient of one of (i) the first plurality of coefficients, or (ii) the second plurality of coefficients, and wherein the equalizer comprises a first plurality of taps configured to, based on the first plurality of coefficients, filter the input signal to generate a first filtered signal, a unity tap configured to, based on the predetermined coefficient, filter the first filtered signal to generate a second filtered signal, and a second plurality of taps configured to, based on the second plurality of coefficients, filter the second filtered signal to generate a third filtered signal; and an output configured to transmit the third filtered signal.

\* \* \* \* \*